US008172182B2

(12) United States Patent
Tanner (10) Patent No.: US 8,172,182 B2
(45) Date of Patent: May 8, 2012

(54) AIRCRAFT SPILLOVER FUEL TANK (75) Inventor: Richard Bruce Tanner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 818 days.

(21) Appl. No.: 12/199,069

(22) Filed: Aug. 27, 2008

(65) Prior Publication Data

US 2010/0051749 A1    Mar. 4, 2010

(51) Int. Cl.
B64D 37/04    (2006.01)
(52) U.S. Cl. ............. 244/135 C; 244/135 R; 244/135 B
(58) Field of Classification Search .............. 244/135 R, 244/135 C, 135 B
See application file for complete search history.

(56) References Cited

U.S. PATENT DOCUMENTS

| 2,516,150 | A | * | 7/1950 | Samiran | 244/135 C |
| 2,585,480 | A | * | 2/1952 | Makhonine | 244/135 R |
| 2,657,884 | A | * | 11/1953 | Merrill | 244/135 B |
| 3,383,078 | A | * | 5/1968 | Shohet et al. | 244/135 R |
| 5,141,179 | A | * | 8/1992 | Gautier | 244/135 R |
| 5,660,358 | A | * | 8/1997 | Grafwallner et al. | 244/135 R |
| 6,125,882 | A | * | 10/2000 | Kong | 244/135 C |
| 6,736,354 | B2 | * | 5/2004 | Goto et al. | 244/135 C |
| 6,899,300 | B2 | * | 5/2005 | Haghayeghi | 244/135 C |
| 6,913,228 | B2 | * | 7/2005 | Lee et al. | 244/135 C |
| 6,997,415 | B2 | * | 2/2006 | Wozniak et al. | 244/135 C |
| 7,073,751 | B1 | * | 7/2006 | Tighe et al. | 244/135 C |
| 7,337,795 | B2 | * | 3/2008 | Johnson et al. | 244/135 C |
| 7,591,277 | B2 | * | 9/2009 | Johnson et al. | 244/135 C |
| 7,600,717 | B2 | * | 10/2009 | Ward | 244/135 R |

* cited by examiner

Primary Examiner — Timothy D Collins
Assistant Examiner — Steven Hawk
(74) Attorney, Agent, or Firm — Hope Baldauff Hartman, LLC (57) ABSTRACT Apparatus and methods described herein provide for a spillover tank to extend the fuel capacity of the main wing tank of an aircraft. The spillover tank is located in the wing of the aircraft adjacent to the main wing tank. At least one aperture exists through the shared barrier between the main wing tank and the spillover tank that allows fuel to flow passively between the tanks. A scavenge pump mechanism driven by motive flow from the main fuel pumps continuously pumps fuel from the spillover tank into the main wing tank.

19 Claims, 6 Drawing Sheets

Figure 6

AIRCRAFT SPILLOVER FUEL TANK

BACKGROUND

The fuel tank system of a long-range commercial airliner often contains a main fuel tank located in each of the wings of the aircraft and a center fuel tank located between the main wing tanks. Each of these fuel tanks typically requires independent fuel systems, including redundant fuel pumps, fuel level sensors, temperature probes, and plumbing for refueling, venting, cross-feeds, and tank-to-tank transfers. Because the center fuel tank normally lies within the 15-degree rotor-bust zone of a wing-mounted engine, it is subject to damage and/or penetration in an uncontained engine failure. Consequently, the fuel in the center fuel tank is normally utilized first during operation to preserve the fuel in the main wing tanks for use for an emergency diversion to an airport in the event of such a failure.

Modifications of an aircraft design are often made to allow the aircraft to efficiently fulfill different roles. For example, a derivative of a commercial airliner may be designed to carry a lighter load on shorter routes than the base design. To accommodate these needs, the fuselage of the airliner may be shortened, accommodating fewer passengers, and the center fuel tank removed. Removing the center fuel tank saves weight from the reduction in overall fuel load as well as the removal of the fuel systems and structures associated with the center fuel tank.

However, it is still desirable to give the derivative aircraft design the greatest fuel capacity possible without adding excessive cost or weight. One solution is to add auxiliary fuel tanks in other areas of the aircraft, such as the fuselage or tail. However, this requires complete fuel systems to be added to the design to support the additional tanks, adding to cost, weight, and complexity as well as potentially requiring substantial modification of the structure of the aircraft. Another alternative involves structurally modifying the main wing tanks and associated fuel systems to extend each of the main wing tanks inboard into the areas previously occupied by the center tank. However, doing so may place the main wing tanks into the 15-degree rotor-bust zone, which is unacceptable for the safety reasons mentioned above.

Moreover, extending the main wing tanks in this fashion may be a costly and complex design modification. It is essential that certain components of the fuel system remain covered with fuel during operation of the aircraft, such as fuel pickups and hydraulic system heat-exchangers. Accordingly, these components must be located at the lowest point of the main wing tank. If the main wing tank is extended inboard on the aircraft, these components often must be relocated to the new low point of the extended tank. This may require the main wing tank fuel systems and plumbing to be redesigned, or may not be feasible at all because of the confined space of the extended portion of the tank.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a spillover tank adjacent to a main wing tank of an aircraft that extends the fuel capacity of the main wing tank. According to aspects presented herein, a spillover tank is provided that includes a fuel chamber located within the wing of the aircraft positioned adjacent to the main wing tank. In one aspect, the fuel chamber is located outside the engine 15-degree rotor burst zone of an aircraft engine mounted on the wing. An aperture or spillover port is located between the main wing tank and the fuel chamber that allows fuel to passively flow between the main wing tank and the fuel chamber. In one aspect, the spillover port is positioned near the top of the shared barrier between the fuel chamber and the main wing tank so that a specific reserve of fuel remains in the main wing tank and does not "spillover" into the fuel chamber during operation of the aircraft. In another aspect, multiple spillover ports may be located between the main wing tank and the fuel chamber.

The spillover tank further includes a pumping mechanism that provides a continuous flow of fuel from the fuel chamber into the main wing tank. In one implementation, the pumping mechanism includes of one or more scavenge pumps driven by motive flow from the primary fuel pumps. In another implementation, the spillover tank further includes a flapper valve located in the barrier between the fuel chamber and the main wing tank that allows aircraft fuel to flow from the fuel chamber to the main wing tank in the event that the fuel level in the main wing tank drops below that in the fuel chamber.

According to further aspects presented herein, a method for extending the main wing tank of an aircraft includes enclosing a chamber within a wing of the aircraft adjacent to the main wing tank to create a spillover tank. One or more apertures or spillover ports are positioned between the spillover tank and the main wing tank to allow fuel to passively flow between the tanks. A pumping mechanism that continuously pumps fuel from the spillover tank into the main wing tank is positioned within the spillover tank. In one implementation, the pumping mechanism includes one or more scavenge pumps driven by motive flow from the primary fuel pumps. In another aspect, a flapper valve is located between the spillover tank and the main wing tank that allows aircraft fuel to flow from the spillover tank to the main wing tank in the event that the fuel level in the main wing tank drops below that in the spillover tank.

In yet a further aspect, a method of providing passive and active fuel flow control for pumping fuel to an aircraft engine from an extension spillover tank includes providing motive flow from the main fuel pump mechanism of a main wing tank to scavenge pumps in the extension spillover tank. The scavenge pumps are used to passively pump fuel from the extension spillover tank into the main wing tank and the main fuel pump mechanism is used to actively pump fuel from the main wing tank to the aircraft engine.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for providing a spillover tank to extend the fuel capacity of the main wing tank of an aircraft. Utilizing the concepts and technologies described herein, a spillover tank can be added to the wing of a derivative design aircraft in the place of a removed center tank. Seals and barriers are installed to enclose an area within the wing structure adjacent to the main tank and outside the engine 15-degree rotor burst zone. Spillover ports located in the barrier between the main wing tank and the adjacent spillover tank allow fuel to passively flow from the main wing tank into the spillover tank. Motive flow scavenge pumps are also installed to constantly pump fuel from the spillover tank back into the main wing tank, keeping the fuel pickups and hydraulic system heat-exchangers located within the main wing tank covered with fuel.

Because the spillover tank is installed utilizing the same seals, barriers, and other construction techniques as the main wing tank and contains only passive fuel systems to move fuel back and forth between the tanks, significant costs savings can be realized in extending the fuel capacity of the main wing tank. Utilizing the spillover tank described herein, the fuel capacity of a derivative design aircraft can be increased without having to significantly modify the fuel system design of the main wing tanks and without the weight, cost, and complexity of adding auxiliary tanks and new fuel systems elsewhere in the aircraft.

Figure 1:
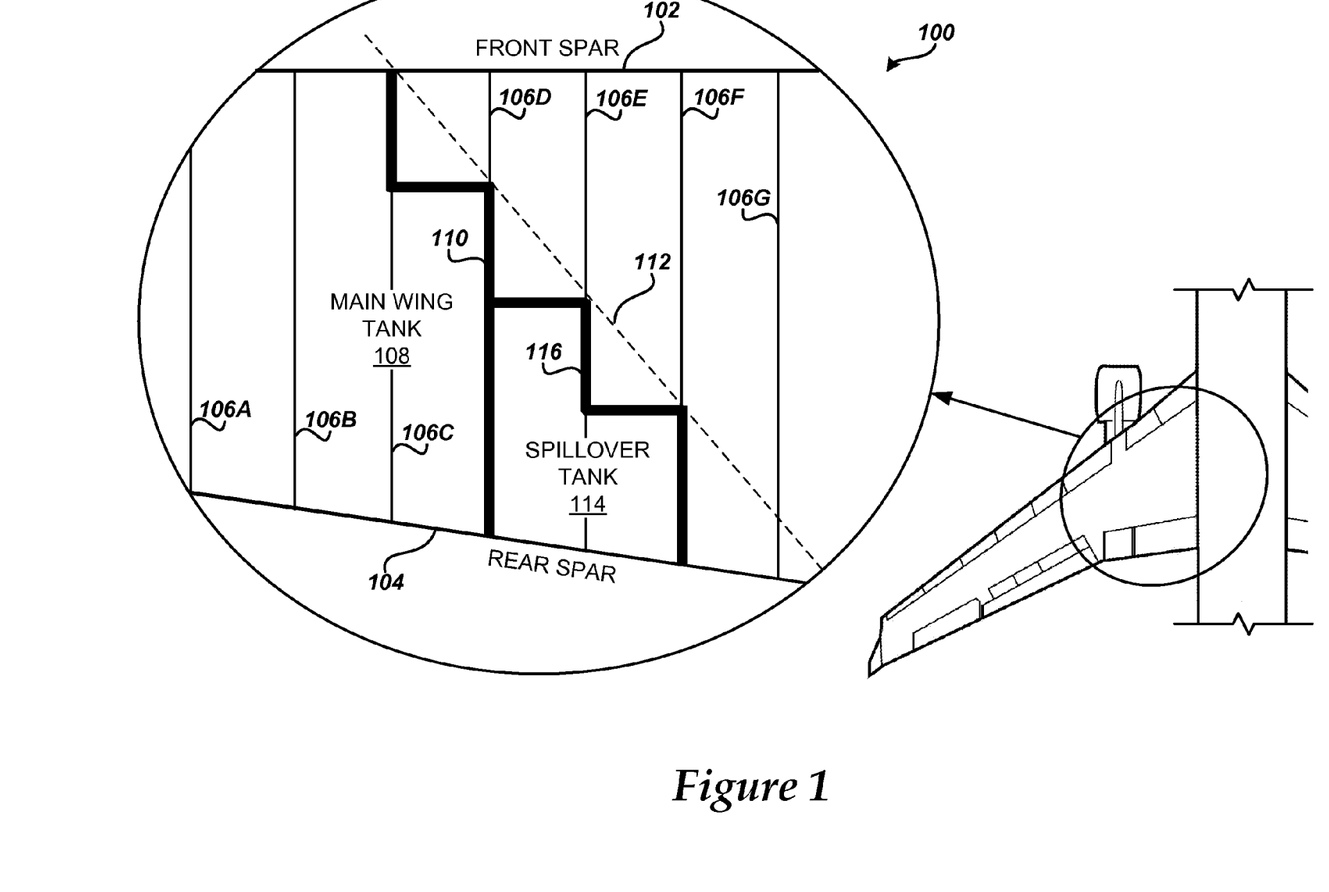
FIG. 1 is a top plan view of the layout of a main wing tank and a spillover tank within the structure of an aircraft wing, according to embodiments presented herein.

In the following detailed description, references are made to the accompanying drawings that form a part hereof, and that show by way of illustration specific embodiments or examples. Referring now to the drawings, in which like numerals represent like elements through the several figures, a spillover tank for an aircraft will be described. FIG. 1 shows a top plan view of a wing of an exemplary aircraft with the upper wing skin removed showing the primary wing structure 100. The primary wing structure 100 includes a front spar 102 and a rear spar 104 that, along with a lower panel and an upper panel (not shown), carry the wing bending loads. The primary wing structure 100 also includes a number of ribs 106A-106G that connect the front spar 102 and rear spar 104, providing support to the upper and lower wing panels and the shape of the wing surface.

According to embodiments, a main wing tank 108 is located within the primary wing structure 100. The main wing tank 108 may be constructed by adding seals and fluid barriers between the front spar 102 and the rear spar 104 and any number of ribs 106A-106G to enclose the main wing tank 108. For example, as illustrated in FIG. 1, the inboard barrier 110 of the main wing tank 108 runs from the front spar 102, aft along rib 106C, then across to rib 106D, and continues aft to the rear spar 104. The remaining portion of the primary wing structure 100 inboard of the main wing tank 108 would traditionally be occupied by a center fuel tank in the base design of a long-range aircraft.

The configuration of the inboard barrier 110 maximizes the size of the main wing tank 108 while maintaining the boundary of the tank outside of the engine 15-degree rotor burst zone, designated in FIG. 1 by line 112. The engine 15-degree rotor burst zone 112 is a zone between 15 degrees forward to 15 degrees aft of the rotational plane of the last turbine stage in a jet or turbo-prop engine mounted on the wing. This zone is designated as the area in which potential damage from fan blades and rotor fragments may occur in the event of an uncontained engine failure.

As discussed above, when the center tank is removed from the design of a derivative aircraft, the area within the primary wing structure 100 inboard of rib 106D is vacant. According to embodiments described herein, a spillover tank 114 is created inboard of and adjacent to the main wing tank 108 using the same seals and fluid barriers as the main wing tank 108. For example, as illustrated in FIG. 1, the spillover tank barrier 116 extends from rib 106D and the inboard barrier 110 of the main wing tank 108 across to rib 106E, aft along rib 106E towards the rear spar 104, then across to rib 106F, and continues along rib 106F aft to the rear spar 104. This configuration of the spillover tank barrier 116 maximizes the size of the spillover tank 114 while maintaining the boundary of the tank outside of the engine 15-degree rotor burst zone 112. It will be appreciated that the spillover tank 114 may be configured in a number of ways and across as many ribs 106D-106G required to encompass as much of the primary wing structure 100 as necessary to achieve the desired increase in fuel capacity while remaining outside the engine 15-degree rotor burst zone 112. It will be further appreciated that the spillover tank 114 may not need to be configured around an engine 15-degree rotor burst zone for an aircraft with fuselage-mounted engines. In this instance, the spillover tank barrier 116 could extend from the rear spar 104 to the front spar 102.

Figure 2:
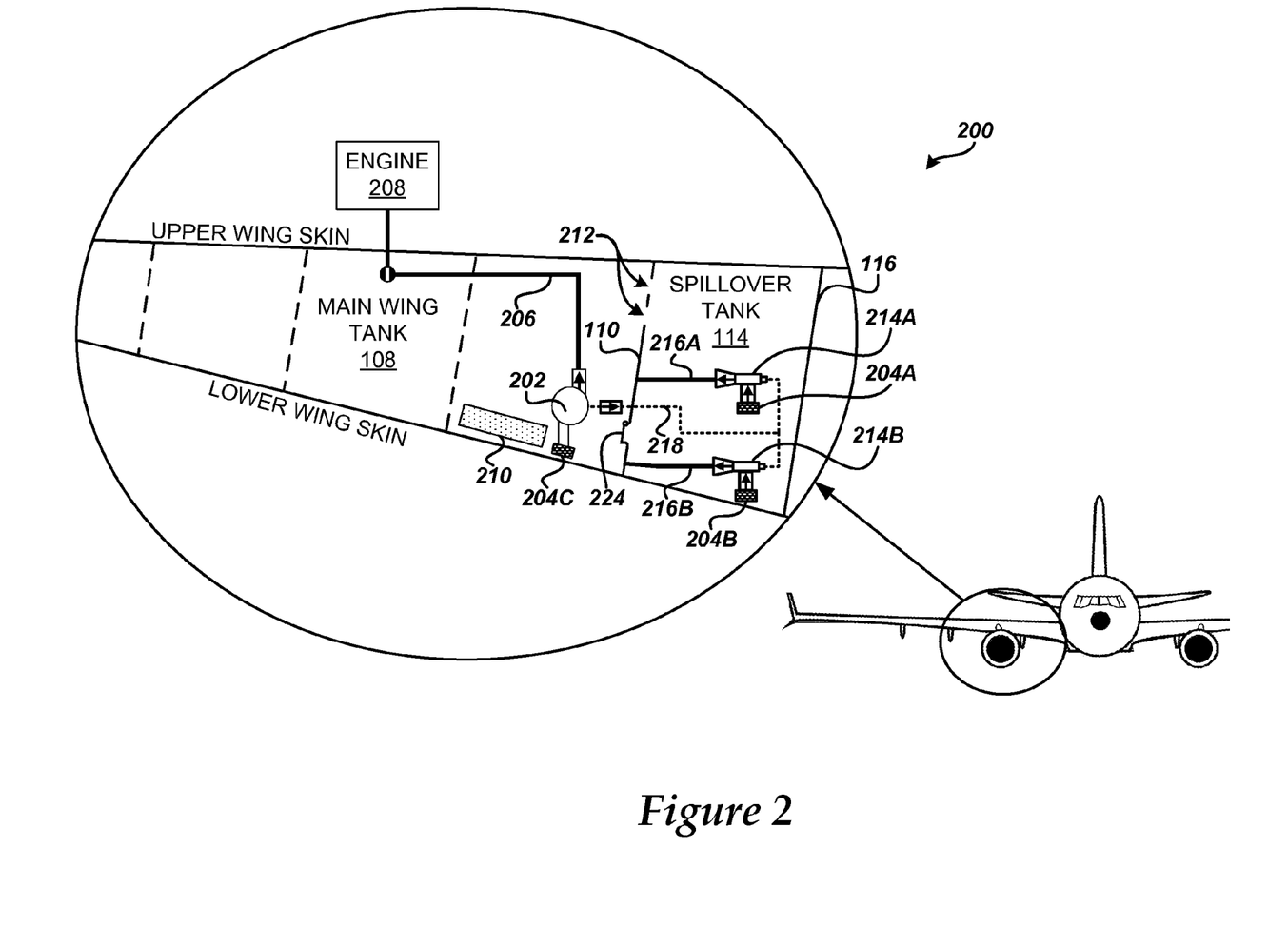
FIG. 2 is a cross-section view of the wing of an exemplary aircraft illustrating fuel system components of a main wing tank and a spillover tank, according to embodiments presented herein.

FIG. 2 is a cross-section view of the wing as seen from the front of the aircraft illustrating further aspects of the main wing tank 108 and spillover tank 114 described above. The fuel system components of the main wing tank 108 include a primary fuel pump 202 which pumps fuel from a fuel pickup 204C in the main wing tank 108, through a main fuel line 206, and to an engine 208 mounted on the wing of the aircraft. The primary fuel pump 202 may be powered by electrical current from the aircraft electrical system or may be driven by "motive flow," or high-pressure flow of fuel from the engine 208 back to the pump 202. The primary fuel pump 202 may be located in the main wing tank 108 or may be a component of the engine 208. The fuel pickup 204C is optimally located at the lowest point within the main wing tank 108. It will be appreciated by one skilled in the art that the fuel system components of the main wing tank 108 illustrated in FIG. 2 represent a simplified system for illustrative purposes, and that the main wing tank fuel system will typically include a number or components including, but not limited to, redundant main fuel pumps, multiple fuel pickups, scavenge pumps, redundant fuel lines to the main engine, and pumps and plumbing for refueling the main wing tank 108 and transferring fuel between the main wing tank 108 and other fuel tanks in the aircraft.

Also included in the fuel system of the main wing tank 108 is a hydraulic system heat-exchanger 210. According to embodiments, the hydraulic system heat-exchanger 210 is used to cool the hydraulic fluid in the hydraulic system of the aircraft. This is accomplished by allowing the hydraulic fluid to flow through the exchanger, which is surrounded by fuel, thus using the fuel as a cold-sink to cool the hydraulic fluid. Accordingly, it is essential that the hydraulic system heat-exchanger 210 remain covered by fuel during the operation of the aircraft, as will be discussed further below in regard to FIG. 4. As with the main wing tank fuel pickup 204C, the hydraulic system heat-exchanger 210 is optimally located at the lowest point within the main wing tank 108.

According to embodiments, one or more spillover ports 212 are located in the inboard barrier 110 of the main wing tank 108 that separates the main wing tank 108 from the adjacent spillover tank 114. The spillover ports 212 are apertures or openings that allow aircraft fuel to passively flow between the main wing tank 108 and the spillover tank 114. The spillover ports 212 are located in the inboard barrier 110 of the main wing tank 108 at a position to ensure that adequate fuel remains in the main wing tank 108 to cover the fuel pickup 204C and the hydraulic system heat-exchanger 210 during operation of the aircraft, even when the aircraft is in a steep bank. It should be understood that the spillover ports 212 are of adequate number and size to allow the high flow rates of fuel that may occur during refueling of the aircraft, as will be described further below in regard to FIG. 3.

The spillover tank 114 also contains one or more scavenge pumps 214A-214B. Each scavenge pump 214A-214B picks up fuel in the spillover tank at a fuel pickup 204A-204B and pumps the fuel back into the main wing tank 108 through a return fuel line 216A-216B. The fuel pickups 204A-204B are optimally located at the lowest point within the spillover tank 114. According to one embodiment, the spillover tank 114 contains two scavenge pumps 214A-214B to allow for redundant operation in case of failure of one of the pumps. The scavenge pumps 214A-214B are driven by motive flow through a motive flow line 218 from the main fuel pump 202 in the main wing tank 108. As long as the primary fuel pump 202 is in operation, the scavenge pumps 214A-214B will continuously pump fuel from the spillover tank 114 to the main wing tank 108.

Utilizing scavenge pumps 214A-214B driven by motive flow from the primary fuel pump 202 allows for a passive fuel system to be incorporated in the spillover tank implementation, which reduces the complexity, weight, and cost of incorporating the spillover tank 114 in the aircraft. It will be appreciated, however, that the scavenge pumps 214A-214B may be powered by electrical current from the aircraft electrical system, or may be driven by motive flow from multiple fuel pumps in the fuel system of the main wing tank 108 in order to provide redundancy.

According to a further embodiment, a flapper valve 224 is located in the inboard barrier 110 between the main wing tank 108 and the spillover tank 114. The flapper valve 224 allows fuel to flow from the spillover tank 114 into the main wing tank 108 but prevents fuel from flowing from the main wing tank 108 back into the spillover tank 114. The flapper valve 224 is optimally located at the lowest point in the inboard barrier 110 between the adjacent tanks. If the level of fuel in the main wing tank 108 falls below that of the level of fuel in the spillover tank 114, the flapper valve 224 will open to allow fuel to flow from the spillover tank 114 into the main wing tank 108. This ensures that reserve fuel does not get trapped in the spillover tank 114 in the event of a failure of the scavenge pumps 214A-214B.

Figure 3A:
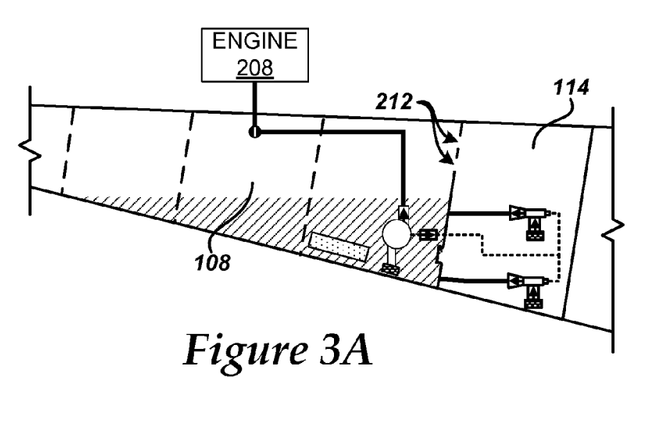
FIGS. 3A-3D are a series of cross-section views of the wing of an exemplary aircraft illustrating the behavior of a spillover fuel tank during the refueling of the aircraft, according to embodiments presented herein.
Figure 3B:
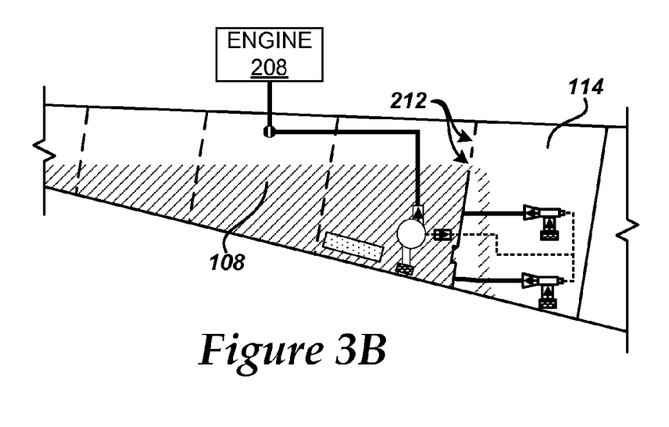

FIGS. 3A-3D illustrate the operation of the spillover tank 114 during the refueling of the aircraft. According to one embodiment, the spillover tank 114 requires no independent refueling plumbing, but simply fills through the spillover ports 212 during the refueling of the main wing tank 108. As the main wing tank 108 is filled during the refueling of the aircraft, the fuel remains in the main wing tank 108 as long as the level of fuel is below the height of the spillover ports 212, as illustrated in FIG. 3A. However, if the level of fuel in the main wing tank 108 rises to a height above the lowest of the spillover ports 212, the fuel will flow or "spillover" into the spillover tank 114, as illustrated in FIG. 3B.

Figure 3C:
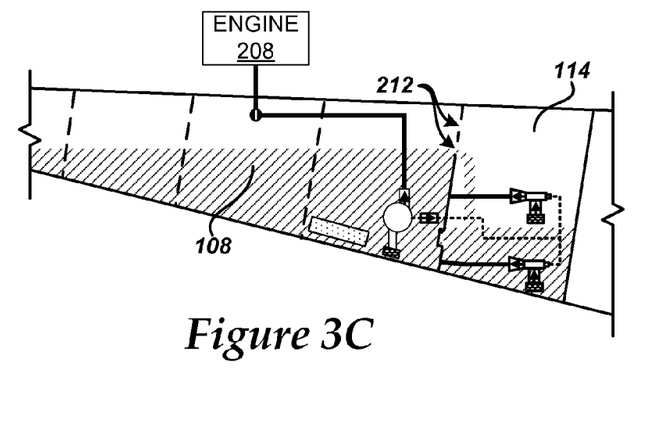
Figure 3D:
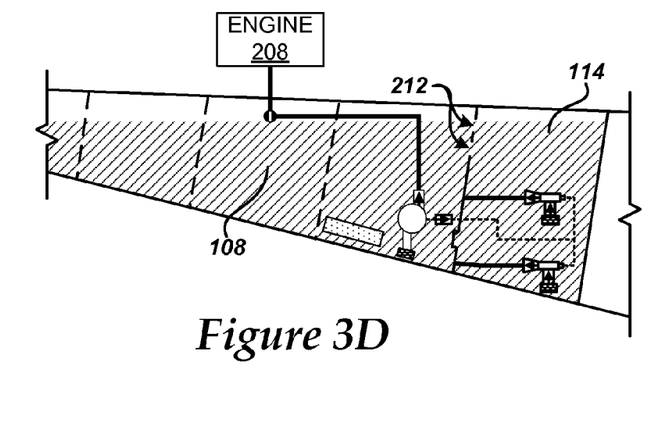

The fuel will continue to flow into the spillover tank 114 during the refueling of the aircraft as long as the level of fuel in the spillover tank 114 is lower than that in the main wing tank 108, as illustrated in FIG. 3C. Accordingly, the number and size of the spillover ports 212 may be determined in part based on the rate of fuel flow during refueling of the aircraft, as described above. In one embodiment, the spillover ports 212 are positioned at the high points on the inboard barrier 110 of the main wing tank 108 to minimize air entrapment in the spillover tank 114, thereby maximizing fuel volume. Once the level of fuel in the spillover tank 114 reaches the level of fuel in the main wing tank 108, both tanks will continue to fill with the fuel at the same levels until refueling is complete, as illustrated in FIG. 3D.

Figure 4:
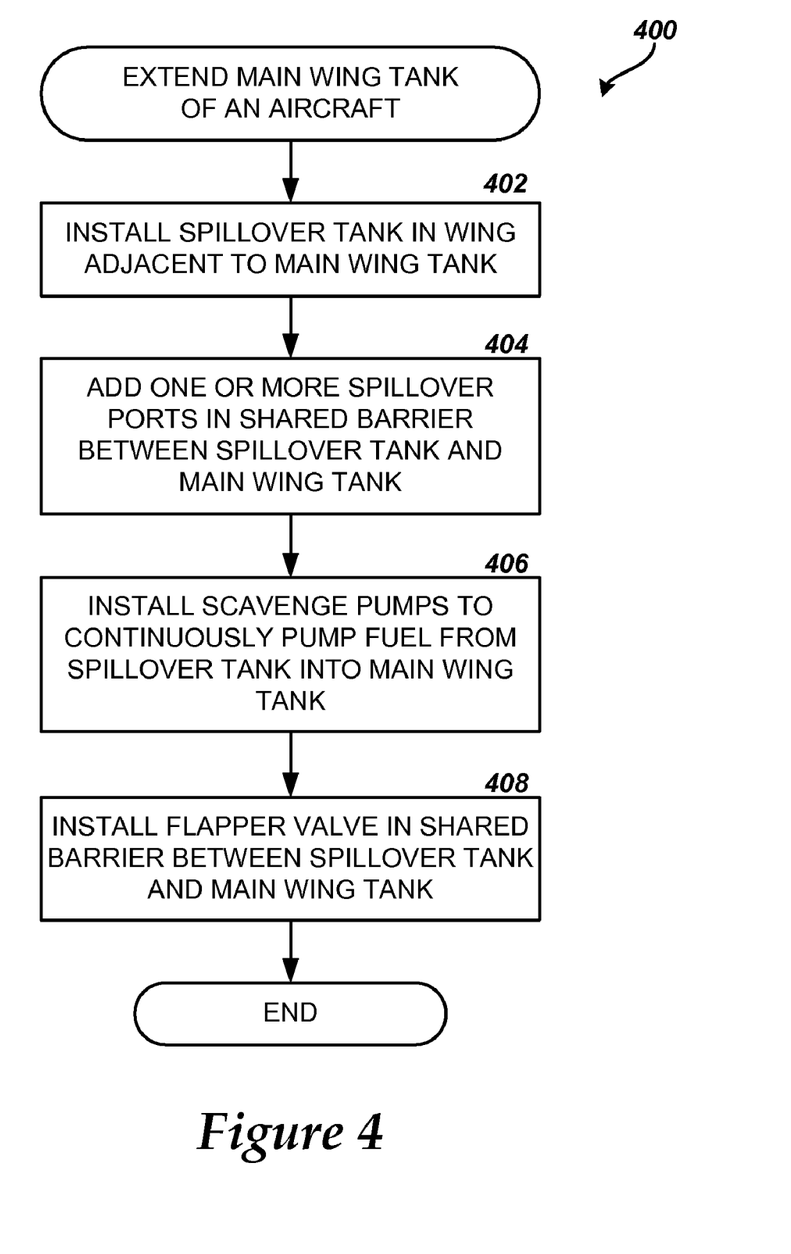
FIG. 4 is a flow diagram showing one method of modifying a derivative aircraft to provide a spillover tank, according to embodiments described herein.

As described above, the spillover tank 114 provides a method of extending the fuel capacity of the main wing tank 108 of an aircraft without requiring the additional weight and complexity of adding a new fuel tank and associated fuel systems or the cost of redesigning the main wing tank 108. FIG. 4 shows one method of modifying a derivative aircraft to provide a spillover tank, according to embodiments described herein. It should be appreciated that more or fewer operations may be performed than shown in FIG. 4 and described below, and that the operations may be performed in a different order than that described herein.

The method 400 begins at operation 402, where the spillover tank 114 is installed in the primary wing structure 100 of the aircraft adjacent to the main wing tank 108. As discussed above, the construction of the spillover tank 114 utilizes the same sealing methods and fluid barriers as the main wing tank 108, thus reducing the cost and complexity of adding the additional tank. Further, the location of the spillover tank 114 within the primary wing structure 100 is designed such that it remains outside the engine 15-degree rotor burst zone 112 as seen in FIG. 1.

From operation 402, the method 400 continues to operation 404, where one or more spillover ports 212 are added in the barrier 110 separating the main wing tank 108 and the adjacent spillover tank 114. The spillover ports 212 allow fuel to passively flow between the main wing tank 108 and the spillover tank 114 during refueling and operation of the aircraft. The spillover ports 212 also minimize air entrapment in the spillover tank 114. As discussed above, the number, size, and location of the spillover ports 212 are determined to ensure that adequate fuel remains in the main wing tank 108 to cover the main fuel pickup 204C and the hydraulic system heat-exchanger 210 during operation of the aircraft as well as allow adequate flow of fuel between the tanks during refueling of the aircraft.

Next, the method 400 proceeds from operation 404 to operation 406, where the scavenge pumps 214A-214B and the associated plumbing are installed to continuously move fuel from the spillover tank 114 to the main wing tank 108 during operation of the aircraft. According to one embodiment, at least two scavenge pumps 214A-214B are located in the spillover tank 114 for redundancy. The scavenge pumps 214A-214B are further designed to be passively driven by motive flow provided from the primary fuel pump 202, reducing complexity in the overall design.

From operation 406, the method 400 proceeds to operation 408, where a flapper valve 224 is installed in the barrier 110 separating the main wing tank 108 and the adjacent spillover tank 114. According to one embodiment, the flapper valve 224 allows fuel to passively flow from the spillover tank 114 to the main wing tank 108 in the case of a failure of the scavenge pumps 214A-214B, as described above in regard to FIG. 2. From operation 408, the method 400 ends.

FIGS. 5A-5D illustrate the operation of the spillover tank 114, main wing tank 108, and associated fuel system components during operation of the aircraft. It will be appreciated that the operation of the fuel system described below and illustrated in FIGS. 5A-5D represents a simplified system in order to show the operation of the spillover tank 114 according to embodiments described herein. As the aircraft engine 208 is running during operation of the aircraft, fuel is withdrawn from the main wing tank 108. The fuel is pumped from the main wing tank 108 by a primary fuel pump 202 that extracts fuel from the tank through at least one fuel pickup 204C located near the bottom the tank. The fuel is delivered to the engine 208 from the main wing tank 108 through the main fuel line 206.

Figure 5A:
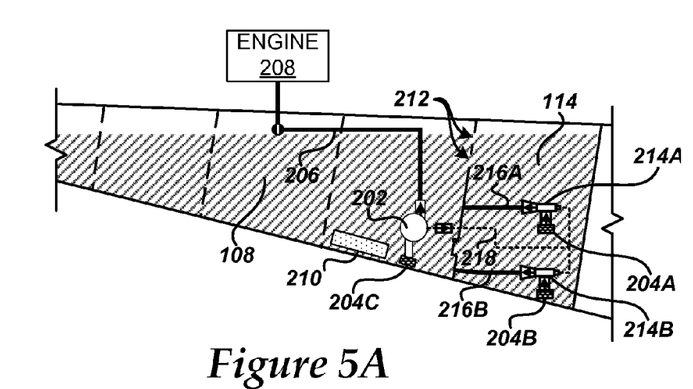
FIGS. 5A-5D are a series of cross-section views of the wing of an exemplary aircraft illustrating the behavior of a spillover fuel tank during the operation of the aircraft, according to embodiments presented herein.

According to one embodiment, the primary fuel pump 202 also provides motive flow through a motive flow line 218 to the scavenge pumps 214A-214B located in the spillover tank 114. The motive flow drives the scavenge pumps 214A-214B which pump fuel from the fuel pickups 204A-204B in the spillover tank 114, through the return fuel lines 216A-216B, and back into the main wing tank 108. As illustrated in FIG. 5A, if the level of fuel in the main wing tank 108 remains above the height of the lowest spillover ports 212, then the fuel pumped from the spillover tank 114 to the main wing tank 108 will simply spillover through the spillover ports 212 back into the spillover tank 114. This results in the level of fuel in the two tanks remaining relatively the same.

Figure 5B:
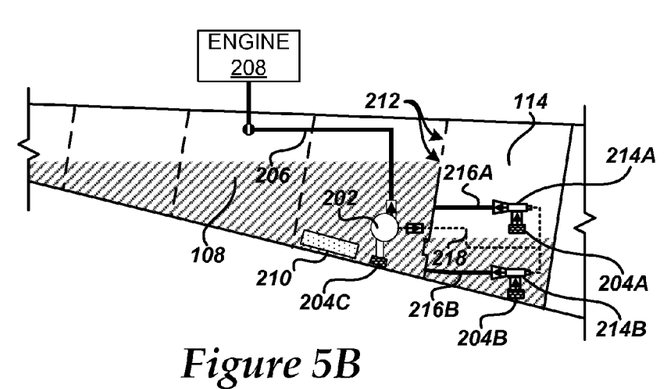
Figure 5C:
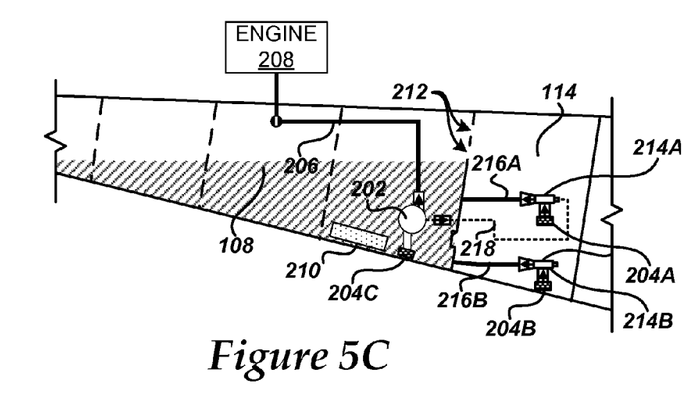
Figure 5D:
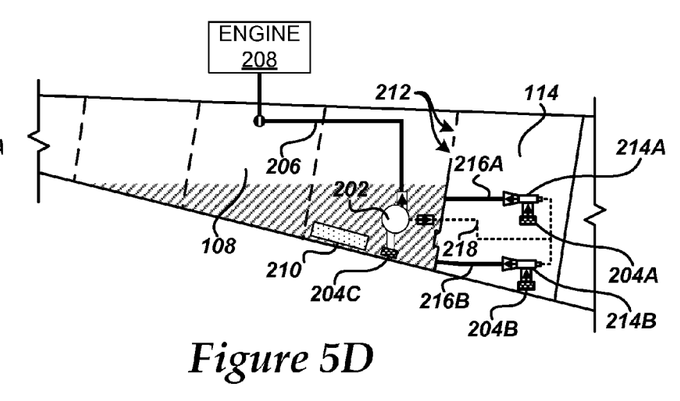

However, if the level of fuel in the main wing tank 108 drops below the height of the lowest spillover ports 212, then the fuel pumped by the scavenge pumps 214A-214B from the spillover tank 114 back into the main wing tank 108 does not return to the spillover tank 114. Consequently, the level of fuel in the spillover tank 114 will begin to drop while the level of fuel in the main tank 108 remains sufficient to cover the main fuel pickup 204C and the hydraulic system heat-exchanger 210, as illustrated in FIG. 5B. This process will continue until the fuel in the spillover tank 114 is exhausted, after which the fuel in the main wing tank 108 will be consumed by the engine 208 during continued operation of the aircraft, as illustrated in FIGS. 5C-5D.

If fuel does subsequently spillover from the main wing tank 108 through the spillover ports 212 into the spillover tank 114, for example during a steep bank of the aircraft, it will be returned to the main wing tank 108 by the scavenge pumps 214A-214B which will continue to operate as long as the main primary fuel pump 202 is in operation. The effect of this system is that the fuel located in the spillover tank 114 is consumed by the engine 208 before any of the reserve level of fuel necessary to cover the hydraulic system heat-exchanger 210 and the main fuel pickup 204C, according to embodiments provided herein.

Figure 6:
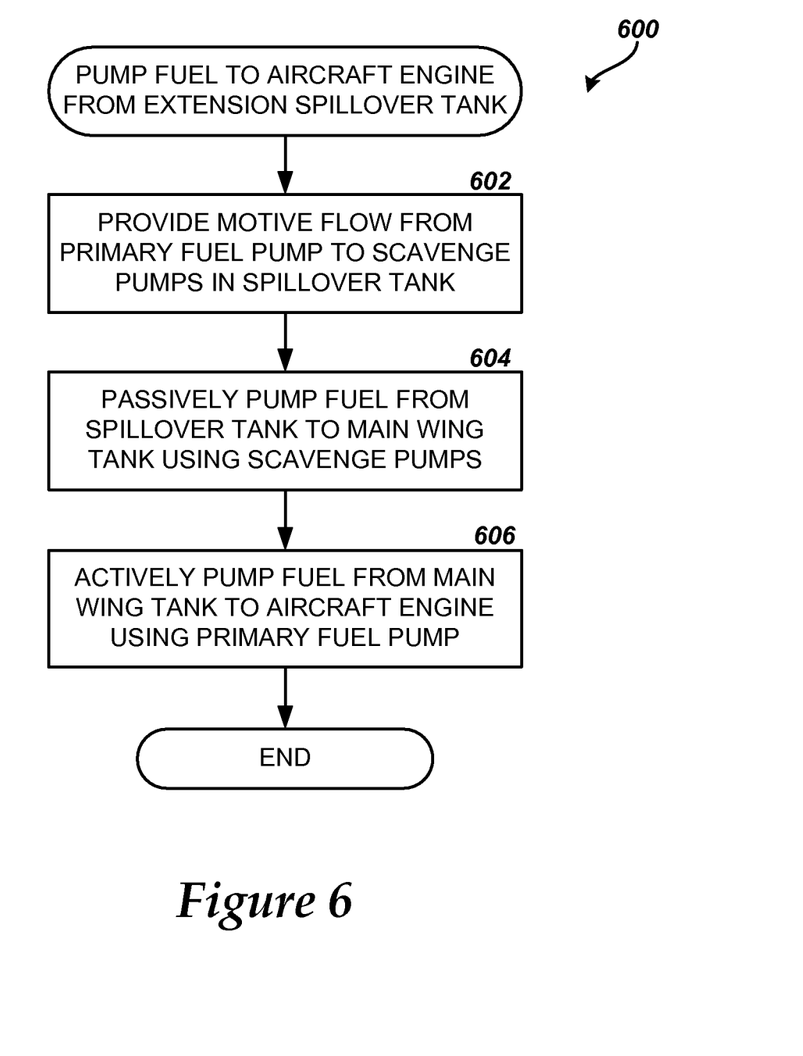
FIG. 6 is a flow diagram showing one method of providing fuel to an aircraft engine from an extension spillover tank, according to embodiments described herein.

FIG. 6 shows a simplified flow diagram to illustrate the operations described above in regard to FIGS. 5A-5D for providing fuel to an aircraft engine from an extension spillover tank. The method 600 begins at operation 602, where the primary fuel pump 202 provides motive flow to the scavenge pumps 214A-214B located in the spillover tank 114. The primary fuel pump 202 provides the motive flow of fuel to the scavenge pumps 214A-214B through the motive flow lines 218 during operation of the primary fuel pump 202, as described above in regard to FIGS. 5A-5D.

The method 600 proceeds from operation 602 to operation 604 where the scavenge pumps 214A-214B utilize the motive flow provided by the primary fuel pump to passively pump fuel from the spillover tank 114 to the main wing tank 108. As described above, the scavenge pumps 214A-214B pump the fuel from the fuel pickups 204A-204B located at the bottom of the spillover tank 114, through the return fuel lines 216A-216B, and into the main wing tank 108. The scavenge pumps 214A-214B continuously move fuel from the spillover tank 114 to the main wing tank 108 as long as the primary fuel pump 202 is in operation. From operation 604, the method 600 proceeds to operation 606, where the primary fuel pump 202 actively pumps the fuel from the main wing tank 108 to the engine 208. The method then ends.

Based on the foregoing, it should be appreciated that technologies for extending the fuel capacity of the main wing tank of an aircraft with a spillover tank are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A spillover fuel tank for an aircraft, comprising:
a barrier enclosing a fuel chamber within a wing of the aircraft inboard of and adjacent to a main wing tank, the main wing tank housing a main fuel pickup of a primary fuel pump, the barrier comprising an aperture between the fuel chamber and the main wing tank configured to allow aircraft fuel to passively flow between the main wing tank and the fuel chamber; the aperture positioned on an upper portion of the barrier between the fuel chamber and the main wing tank such as to prevent a reserved amount of fuel in the main wing tank sufficient to cover the fuel pickup from flowing into the fuel chamber; and
a pump mechanism operative to provide a continuous flow of fuel from the fuel chamber into the main wing tank such that the reserve amount of fuel remains in the main wing tank as the fuel in the fuel chamber is exhausted.

2. The spillover fuel tank of claim 1, wherein an entirety of the fuel chamber is disposed outside a rotor burst zone of an aircraft engine mounted on the wing.

3. The spillover fuel tank of claim 1, further comprising a plurality of apertures between the fuel chamber and the main wing tank configured to allow aircraft fuel to flow between the main wing tank and the fuel chamber.

4. The spillover fuel tank of claim 3, wherein a number and a size of the plurality of apertures is configured to allow a flow rate of aircraft fuel from the main wing tank to the fuel chamber greater than or equal to a rate of refueling of the aircraft.

5. The spillover fuel tank of claim 1, further comprising a flapper valve through the barrier between the fuel chamber and the main wing tank configured to allow aircraft fuel to flow from the fuel chamber to the main wing tank and to prevent aircraft fuel from flowing from the main wing tank to the fuel chamber.

6. The spillover fuel tank of claim 5, wherein the flapper valve is positioned on a lower portion of the barrier between the fuel chamber and the main wing tank such as to allow aircraft fuel to flow from the fuel chamber to the main wing tank when a level of aircraft fuel in the main wing tank becomes lower than a level of aircraft fuel in the fuel chamber.

7. The spillover fuel tank of claim 1, wherein the pump mechanism comprises one or more scavenge pumps located within the fuel chamber.

8. The spillover fuel tank of claim 7, wherein the one or more scavenge pumps are driven by motive flow from a main engine pump mechanism.

9. A method of extending a main wing tank of an aircraft, comprising:
- enclosing a chamber within a wing of the aircraft adjacent to and inboard of the main wing tank to create a spillover tank;
- providing an aperture in a barrier between the spillover tank and the main wing tank on an upper portion of the barrier configured to allow aircraft fuel to passively flow between the main wing tank and the spillover tank such that a reserved amount of fuel remains in the main wing tank sufficient to cover a fuel pickup for a primary fuel pump and a hydraulic heat exchanger; and
- providing a pump mechanism operative to provide a continuous flow of aircraft fuel from the spillover tank into the main wing tank such that the reserve amount of fuel remains in the main wing tank as the fuel in the spillover tank is exhausted.

10. The method of claim 9, wherein the spillover tank is disposed outside a rotor burst zone of an aircraft engine mounted on the wing.

11. The method of claim 9, further comprising providing a plurality of apertures in the barrier between the spillover tank and the main wing tank to allow a flow rate of aircraft fuel from the main wing tank to the spillover tank greater than or equal to a rate of refueling of the aircraft.

12. The method of claim 9, further comprising positioning a flapper valve in the barrier between the spillover tank and the main wing tank on a lower portion of the barrier such as to allow aircraft fuel to flow from the spillover tank to the main wing tank when a level of aircraft fuel in the main wing tank becomes lower than a level of aircraft fuel in the spillover tank.

13. The method of claim 9, wherein the pump mechanism comprises one or more scavenge pumps located within the spillover tank.

14. The method of claim 13, wherein the one or more scavenge pumps are driven by motive flow from a main engine pump mechanism.

15. A method of passive and active fuel flow control to provide fuel to an aircraft engine from an extension spillover tank comprising:
- providing motive fuel flow from a main fuel pump mechanism of a main wing tank to a scavenge pump mechanism in the extension spillover tank, the extension spillover tank connected to the main wing tank by at least one aperture in a barrier between the extension spillover tank and the main wing tank configured to allow fuel to passively flow between the main wing tank and the spillover tank, the at least one aperture positioned on an upper portion of the barrier such as to prevent a reserved amount of fuel in the main wing tank sufficient to cover a fuel pickup of the main fuel pump mechanism from flowing into the extension spillover tank;
- passively pumping fuel from the extension spillover tank into the main wing tank utilizing the scavenge pump mechanism; and
- actively pumping fuel from the main wing tank to the aircraft engine using the main fuel pump mechanism.

16. The method of claim 15, wherein the extension spillover tank is contained within a primary wing structure of an aircraft inboard of and adjacent to the main wing tank.

17. The method of claim 16, wherein the extension spillover tank is disposed outside a rotor burst zone of the aircraft engine mounted on a wing of the aircraft.

18. The method of claim 16, further comprising positioning a flapper valve in a barrier between the extension spillover tank and the main wing on a lower portion of the barrier such as to allow fuel to passively flow from the spillover tank to the main wing tank when a level of fuel in the main wing tank becomes lower than a level of fuel in the spillover tank.

19. The spillover fuel tank of claim 1, wherein the main wing tank further houses a hydraulic system heat exchanger and wherein the reserved amount of fuel in the main wing tank is further sufficient to cover the hydraulic system heat exchanger.

* * * * *